United States Patent
Park et al.

(10) Patent No.: US 7,509,824 B2
(45) Date of Patent: Mar. 31, 2009

(54) WASHING MACHINE WITH DEVICE FOR DATA EXCHANGE TO/FROM EXTERNAL DEVICE

(75) Inventors: Hye Yong Park, Changwon-shi (KR); Seong-Jin Jo, Changwon-shi (KR); Kwon-Ki Hong, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/819,303

(22) Filed: Jun. 26, 2007

(65) Prior Publication Data

US 2008/0006064 A1 Jan. 10, 2008

Related U.S. Application Data

(62) Division of application No. 10/343,230, filed as application No. PCT/KR01/01328 on Aug. 4, 2001, now abandoned.

(30) Foreign Application Priority Data

| Aug. 5, 2000 | (KR) | 10-2000-0045439 |
| Aug. 5, 2000 | (KR) | 10-2000-0045456 |
| Aug. 5, 2000 | (KR) | 10-2000-0045457 |
| Aug. 5, 2000 | (KR) | 10-2000-0045458 |

(51) Int. Cl.
  *D06F 33/02* (2006.01)
  *D06F 35/00* (2006.01)
(52) U.S. Cl. .................. 68/12.23; 68/13 R
(58) Field of Classification Search .......... 68/3 R, 68/12.01, 12.16, 12.23, 13 R
See application file for complete search history.

(56) References Cited

U.S. PATENT DOCUMENTS

| 4,663,538 A | 5/1987 | Cotton et al. |
| 4,986,092 A | 1/1991 | Sood et al. |
| 5,086,385 A * | 2/1992 | Launey et al. ............ 700/83 |
| 5,272,892 A | 12/1993 | Janutka et al. |
| 5,390,385 A | 2/1995 | Beldham |
| 5,412,291 A | 5/1995 | Payne et al. |
| 5,424,940 A | 6/1995 | Ousborne |
| 5,647,231 A | 7/1997 | Payne et al. |
| 5,839,097 A | 11/1998 | Klausner |

(Continued)

FOREIGN PATENT DOCUMENTS

CN 1144285 A 3/1997

(Continued)

OTHER PUBLICATIONS

Non-Final Office Action dated Mar. 17, 2006 for U.S. Appl. No. 10/343, 230.

(Continued)

*Primary Examiner*—Joseph L Perrin
(74) *Attorney, Agent, or Firm*—McKenna Long & Aldridge LLP (57) ABSTRACT

The object of the present invention lies on providing a washing machine with a device for connection to an outside required for connecting to wire/wireless communication and Internet technologies. The washing machine includes a controller fitted to a body for washing control, and a device fitted at one side of the body for exchange washing related data between the controller and an external device.

3 Claims, 7 Drawing Sheets

U.S. PATENT DOCUMENTS

| | | | |
|---|---|---|---|
| 5,987,105 A | 11/1999 | Jenkins et al. | |
| 6,167,358 A | 12/2000 | Othmer et al. | |
| 6,241,782 B1 * | 6/2001 | Vande Haar | 8/159 |
| 6,305,984 B1 * | 10/2001 | Katoh et al. | 439/607 |
| 6,374,079 B1 * | 4/2002 | Hsu | 455/11.1 |
| 6,454,581 B1 * | 9/2002 | Ribeiro | 439/148 |
| 6,618,162 B1 * | 9/2003 | Wiklof et al. | 358/1.15 |
| 6,665,384 B2 * | 12/2003 | Daum et al. | 379/102.03 |
| 6,813,524 B2 * | 11/2004 | Peterson et al. | 700/13 |
| 2001/0003071 A1 * | 6/2001 | Mansutti et al. | 439/133 |
| 2001/0039460 A1 | 11/2001 | Aisa | |
| 2002/0013819 A1 * | 1/2002 | Lim et al. | 709/208 |
| 2003/0023956 A1 * | 1/2003 | Dulberg et al. | 717/130 |

FOREIGN PATENT DOCUMENTS

| | | |
|---|---|---|
| DE | 3902471 | 2/1990 |
| DE | 4332317 A1 | 5/1994 |
| EP | 0742308 A1 | 11/1996 |
| EP | 0851054 A2 | 7/1998 |
| EP | 1143313 A2 | 10/2001 |
| GB | 2 276 020 | 9/1994 |
| JP | 8-84891 | 4/1996 |
| JP | 09-084989 A | 3/1997 |
| JP | 10174799 | 6/1998 |
| JP | 2001-314690 A | 11/2001 |
| KR | 20-1998-0021774 | 7/1998 |
| KR | 20-1999-0006155 | 2/1999 |
| KR | 10-1999-0027359 | 4/1999 |
| WO | WO-94/22261 A1 | 9/1994 |
| WO | WO-98/30941 A1 | 7/1998 |

OTHER PUBLICATIONS

Final Office Action dated Oct. 26, 2006 for U.S. Appl. No. 10/343,230.

Advisory Action dated Apr. 12, 2007 for U.S. Appl. No. 10/343,230.

* cited by examiner

WASHING MACHINE WITH DEVICE FOR DATA EXCHANGE TO/FROM EXTERNAL DEVICE

This application is a divisional application of U.S. application Ser. No. 10/343,230, filed Jan. 30, 2003 which claims priority to PCT/KR01/01328 filed Aug. 4, 2001, which claims priority to KR 2000-45439 filed on Aug. 5, 2000, KR 2000-45456 filed on Aug. 5, 2000, KR 2000-45457 filed on Aug. 5, 2000, and KR 2000-45458 filed on Aug. 5, 2000. All of the above identified applications are hereby incorporated by reference.

TECHNICAL FIELD

The present invention relates to a washing machine, and more particularly, to a washing machine with a device for exchange of data related to washing with an external device.

BACKGROUND ART

Figure 1:
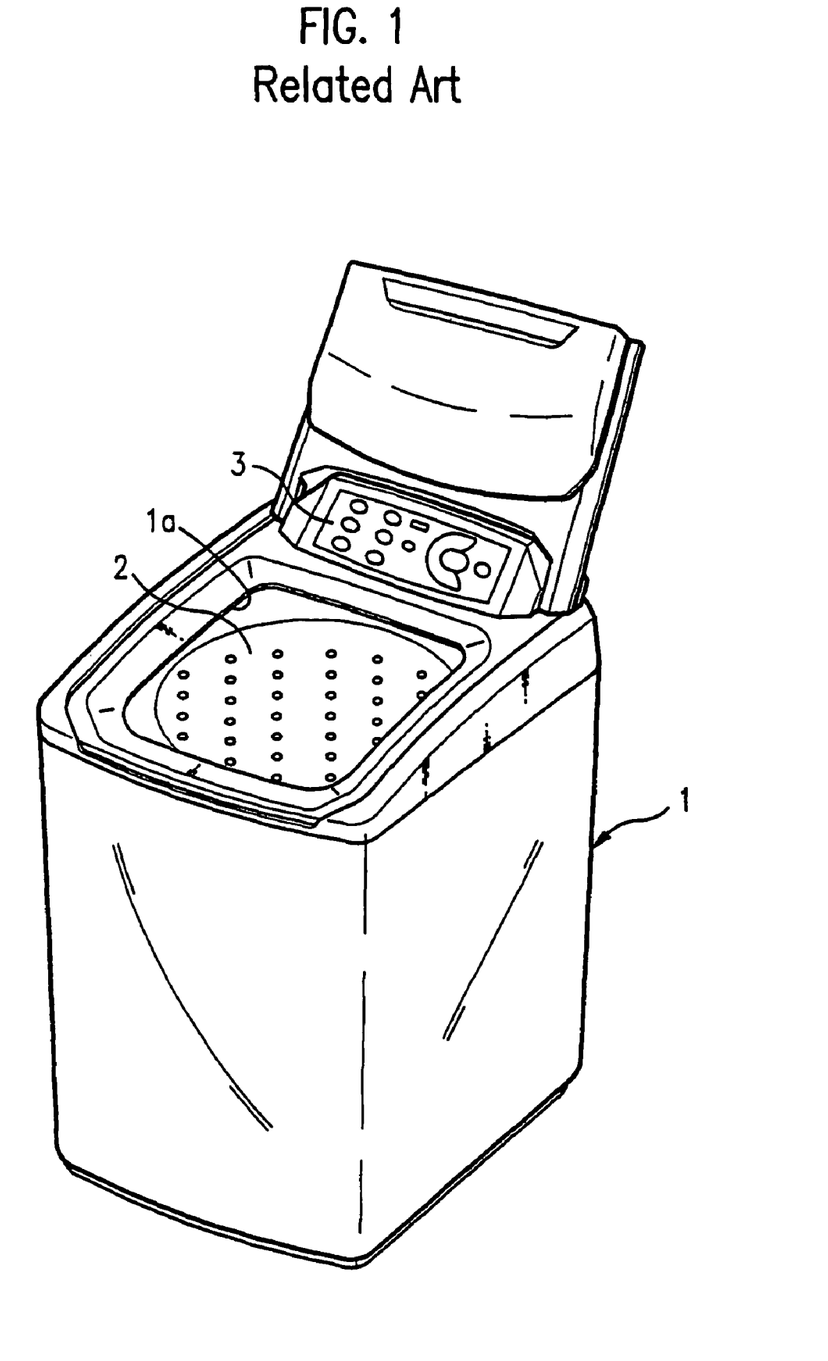
FIG. 1 illustrates a perspective view showing one example of a related art washing machine.

In general, as shown in FIG. 1, in the washing machines, there are vertical type washing machines that have a water storage tub 1 and a washing tub 2 fitted vertical to the ground, drum type washing machines (not shown) that have the water storage tub and the washing tub fitted parallel to the ground, and a tilted type washing machines (not shown) that have the washing tub 2 tilted to the ground.

In the meantime, the vertical type washing machine, utilizing friction caused by water circulation formed as a plusator rotates under the control of a controller, or permeation of water through laundry caused by rotation of an inner tub, softening of detergent, and the like, and the drum type washing machine, utilizing impact to the laundry caused by rotation of drum, and the softening of detergent, for removal of various contaminants stuck to clothes, and bedding, are the necessaries of life.

However, since the foregoing related art washing machines can carry out washing only according to a program built in at a time of production only, alteration of the program into another program that can improve a washing performance and efficiency is not possible. That is, since the washing performance and the efficiency are fixed almost depending on the washing program built in initially, the washing machine once sold can not be improved of its control performance as the washing machine once sold carries out washing only depending on the program built in at the time of production.

Accordingly, a necessity for a two way learnable washing machine comes up recently, which can improve a performance as the washing machine transmits/receives various information to/from an external main computer or a mobile station (a hand phone, or the like), keeping pace with development of Internet technologies using wire/wireless exchange. For an example, it is recent trend that the washing performance is improved by down loading a washing program that can improve the washing performance compared to the washing program built in presently through wire/wireless exchange, Internet, and the like, or a washing machine is developed, which can detect and up load various factors that fix the washing performance, and the washing efficiency, such as an amount and kind of laundry, an amount of detergent continuously, and down load a washing program again that most suits to a state of use of the washing machine based on the up loaded various factors, for optimizing the washing machine performance to suit to individual states of use.

Moreover, a function is required, in which the user controls operation of the washing machine in home through wire/wireless exchange, or the Internet from outside of the home.

DISCLOSURE OF THE INVENTION

Accordingly, the present invention is directed to a washing machine with a device for data exchange with an external device that substantially obviates one or more of the problems due to limitations and disadvantages of the related art.

An object of the present invention is to provide a washing machine with a device for data exchange with an external device, which permits to use wire/wireless exchange, and the Internet technology to keep pace with the recent requirements.

Other object of the present invention is to provide a device for connection with an external device, which is suitable for characteristics of the washing machine by designing that washing water inflow to a connector part is prevented to protect the connector part, because the washing machine, basically an apparatus using water, is susceptible to cause short at the connector part between a connection port and cable by water.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the washing machine includes a controller fitted to a body for washing control, and a device fitted at one side of the body for exchange washing related data between the controller and an external device.

In a first embodiment of the present invention, the device includes a circuit board connected for transmission/reception of an electrical signal to/from the controller, and a connection port fitted to the circuit board for exchange of washing related data with the external device.

The washing machine as claimed in claim 2, wherein the device further includes a coating material coated on an upper surface and bottom surface of the circuit board for cutting off water infiltration into circuit lines on the circuit board, and a waterproof shell surrounding an outside of the connection port for cutting off inflow of the water into inside of the connection port.

The connection port is hook coupled to the circuit board for transmission of a load exerted to the connection port to the circuit board when the cable is connected/disconnected to the connection port.

There is an opening on the control panel over the connection port for access to the connection port, and a rubber plug in the opening for plugging the opening when the cable is not connected to prevent inflow of the water.

In a second embodiment of the present invention, the device includes a circuit board built in the controller in the body, a connection port at a rear or side surface of the body for exchange of washing related data with the external device, and a lead line connecting the connection port and the circuit board.

There is the connection port and a waterproof member to surround an outside of the connection port fitted to a part of the body.

It is preferable that the connection port and the waterproof member are fitted to one side of the rear surface or side surface of the body, and the waterproof member has a form to surround the connection port spaced from the outside surface of the connection port, with an opening at one side for connection of a connector thereto from outside.

In a third embodiment of the present invention, the device includes a circuit board fitted to one side of the controller on the body, a lead line connected to the circuit board, passed through a part of the body, and exposed for a distance from an outside of the body, a connection port fitted to a fore end of the lead line for washing related data exchange with the external device, and hold means on the body for holding the connection port when the connection port is not connected.

The hold means includes a pocket in a body, and a cover for cutting off inflow of water into the pocket, and preventing the connection port held in the pocket from being fallen off the hold means.

The edges of the cover have a form to wrap edges of the pocket for double cutting off inflow of water through a slot in the pocket.

The cover and the pocket are preferably hinge coupled.

The pocket has a slot at a lower part of an inlet to the pocket for passing the lead line when the connection port is held in the pocket.

The pocket is fitted to the rear surface, or the side surface of the body.

In a fourth embodiment of the present invention, the device includes a first radio transceiver fitted to a position at an outside of the control panel, a circuit board fitted to a position at an inside of the control panel, and a second radio transceiver fitted to a position on the circuit board for transmission/reception of a radio signal to/from the first radio transceiver.

The first radio transceiver is connected to an external terminal, such as a PC, a telephone set, or the like.

The first radio transceiver is put in a "U" formed cavity formed in the control panel, and a bottom of the cavity is formed of a material a light can transmit therethrough.

The cavity has a drain hole at one side of a lower part for draining the water in the cavity, and the drain hole has a drain passage fitted thereto.

The first radio transceiver and the control panel are coupled as hooks projected from both sides of a bottom of the first radio transceiver and hook slots in female hooks projected from edges of a transparent window formed on the control panel are coupled.

The first radio transceiver and the second radio transceiver are UV ray ports.

In a fifth embodiment of the present invention, the device includes a first radio transceiver fitted to a position at an inside of the control panel, a circuit board fitted to a position at an inside of the control panel, and a second radio transceiver fitted to a position on the circuit board for transmission/reception of a radio signal to/from the first radio transceiver.

The first radio transceiver is connected to an external terminal, such as a PC or a telephone set, and the first radio transceiver and the second radio transceiver are UV ray ports.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. The device for data exchange with an external device in accordance with a first preferred embodiment of the present invention will be explained with reference to FIGS. 1-4. In a washing machine having a controller (not shown) for controlling washing in a body 1, the device for exchange of data related to washing between the controller and an external device is provided at one side of the body 1.

Figure 2:
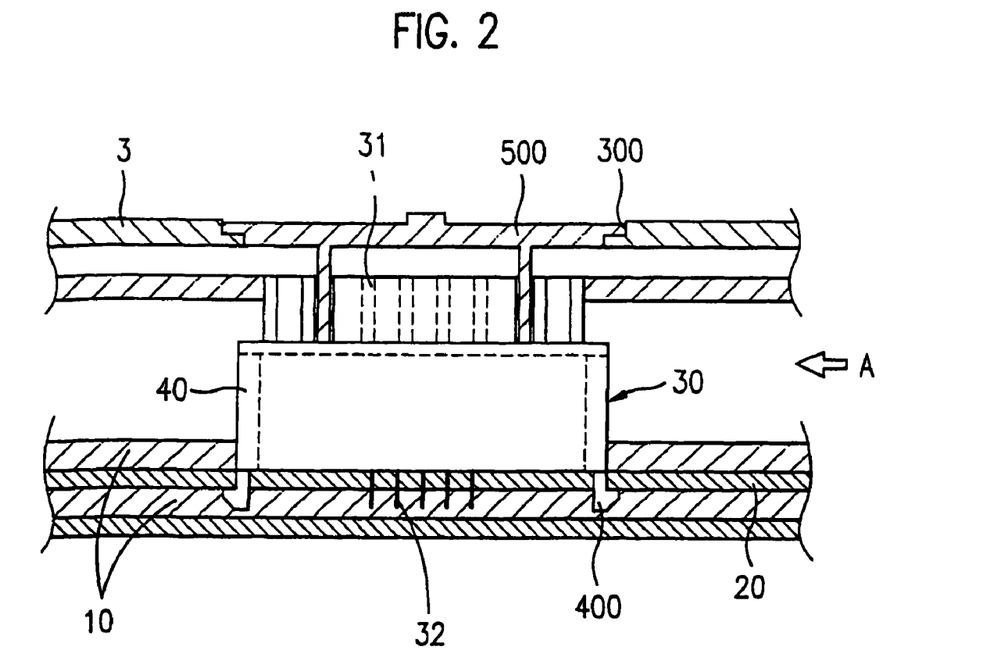
FIG. 2 illustrates a section of a device for data exchange with an external device in accordance with a first preferred embodiment of the present invention.
Figure 3A:
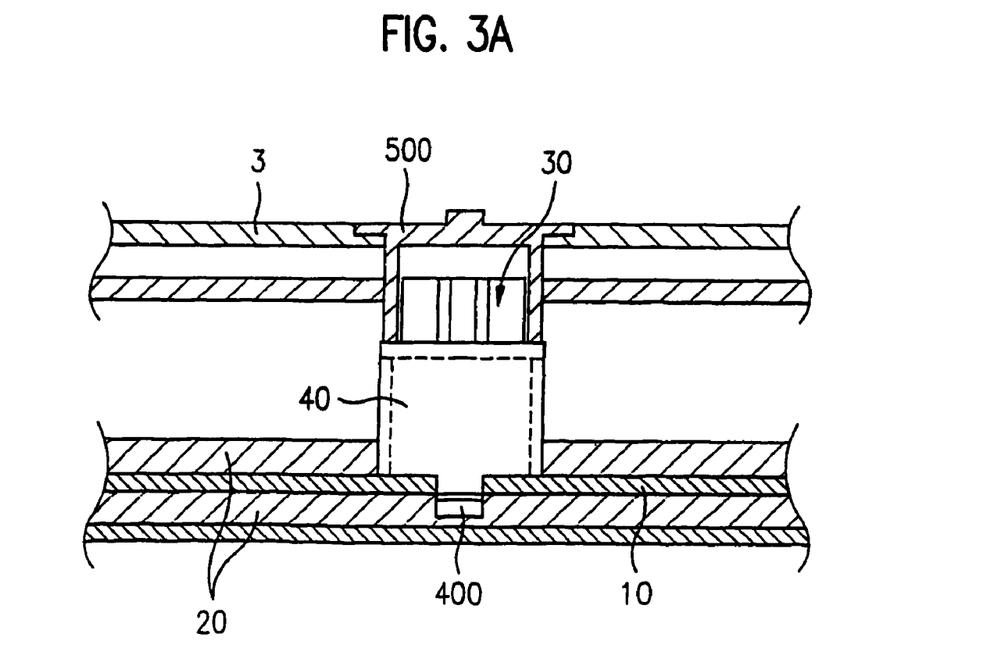
FIG. 3A illustrates a section seen from A direction in FIG. 2.
Figure 3B:
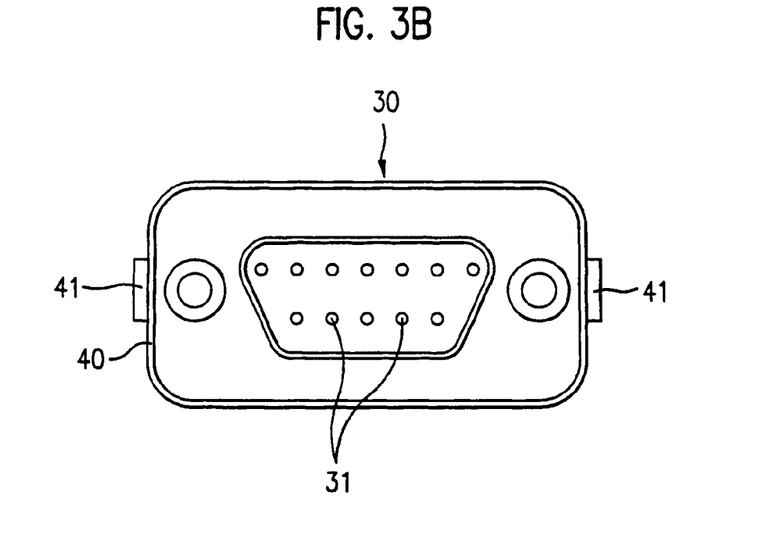
FIG. 3B illustrates a plan view showing the connection port in FIG. 2.

The device for data exchange with an external device in accordance with a first preferred embodiment of the present invention includes a circuit board 20 connected for exchange of electrical signal with a controller, and a connection port 30 on the circuit board 20 for exchange of data related to washing with an external device. The device for data exchange with an external device further includes layers of coating 10 on and below the circuit board 20 for cutting off infiltration of water into wires on the circuit board 20, and a waterproof shell 40 for cutting off infiltration of water into the connection port 30. The connection port 30 is hooked in the circuit board 20 for distribution of a force applied to the connection port 30 throughout the connection port 30 without concentration on soldered parts between pins 32 on the connection port 30 and the circuit board 20 when a cable (not shown) is connected to, or disconnected from the connection port 30. That is, the waterproof shell 40 outside of the connection port 30 is formed by insert injection molding so as to fit to an outside shell of the connection port 30 tightly, and has hooks 400 projected from a bottom of the connection port 30 for coupling to the circuit board 20. Along with this, the control panel 3 over the connection port 30 has an opening 300 for access to the connection port 30, with a rubber plug 500 in the opening 300 for closing the opening 300 when no cable is connected for prevention of inflow of water to the connection port 30.

The work of the device for data exchange with an external device in accordance with a first preferred embodiment of the present invention will be explained.

According to the present invention, a connecting structure is provided, which connects the washing machine and a terminal, such as a home PC (Personal Computer), for downloading an external data, or up-loading various washing information detected during operation of the washing machine to an external device, through the connection port 30 on the circuit board 20. That is, implementation of functions for detecting an amount of laundry, kinds of laundry, and the like, information on use of the washing machine, and transmission of the information to outside of the washing machine, and functions for receiving a program required for the washing machine from outside of the washing machine, or direct control of the washing machine from outside of the washing machine are made possible.

In the meantime, as the washing machine deals with water, all electronic components in the washing machine are required to be waterproof. To do this, in the embodiment of the present invention, a waterproof shell 40 is coated on the outside surface of the connection port 30 by insert injection molding, the connection port 30 is fitted to the circuit board 20 by hooks, upper and lower surfaces of the circuit board 20 are coated 10 for cutting off infiltration of water into the circuit board 20 and the connection port 30. That is, since the connection port 30 is coated by a coating material 10, inflow of water into the pin holes 31 through a circumference of the connection port 30 is prevented. In short, since inflow of water through circumference of the connection port 30 is prevented by the coating material 10, eliminating a possibility of short between electric components set inside of the connection port 30, malfunction of the device is prevented in advance, and corrosion by moist can be prevented, that prolongs a lifetime of the component. As infiltration of the coating material 10 into the pin holes 31 in the connection port 30 is prevented by the waterproof shell 40 in coating the coating material 10 on the circuit board 20, there will not be such a case when the cable is not connected to the connection port when the cable is connected to the connection port 30 from outside of the washing machine, because the pin hole is blocked with the coating material 10.

Since the connection port 30 and the cable are detachable, to separate the cable from the connection port when the connection port 30 is not in use, if only the pins 32 projected from the bottom of the connection port 30 and the circuit board 20 are coupled, the force applied to the connection port 30 will be transmitted to the pins 32, circuit board 20, and the soldered part fully, to fall the pins off the connection port 30, or to crack the circuit board 20. Therefore, in the embodiment of the present invention, when the waterproof shell 40 is insert injection molded, separate hooks 400 are provided, projected from the bottom of the waterproof shell 40 for coupling the hooks 400 with the circuit board 20, so that the force applied to the soldered part between the pins 32 and the circuit board 20 is distributed to the hook coupled parts.

The plug 500 in the opening 300 which is provided for access to the connection port from the control panel 3 over the connection port 30 prevents inflow of water through the opening 300 when the cable is not connected. Because the connection port 30 in the embodiment of the present invention has a female structured connector with pin holes 31, inflow of water into the pin holes, and therefrom to the circuit board 20, is prevented in advance for prevention of large probability of shorts caused between electric components. Thus, in order to cut off inflow of water into the pin holes 31 when the pin holes 31 are not connected with cables, the plug 500 is detachably fitted to a part over the connection port 30. Moreover, it can be known that the plug is still required even if connection port 30 is, not the female structure having the pin holes 31 formed therein, but a male structure having the pins formed thereon. The plug 500 is preferably formed of rubber, because, as the rubber is elastic, the rubber enlarges a sealing area relatively when the plug 500 is strongly pressed to the other member, which permits to cut off inflow of water, more positively.

Figure 4:
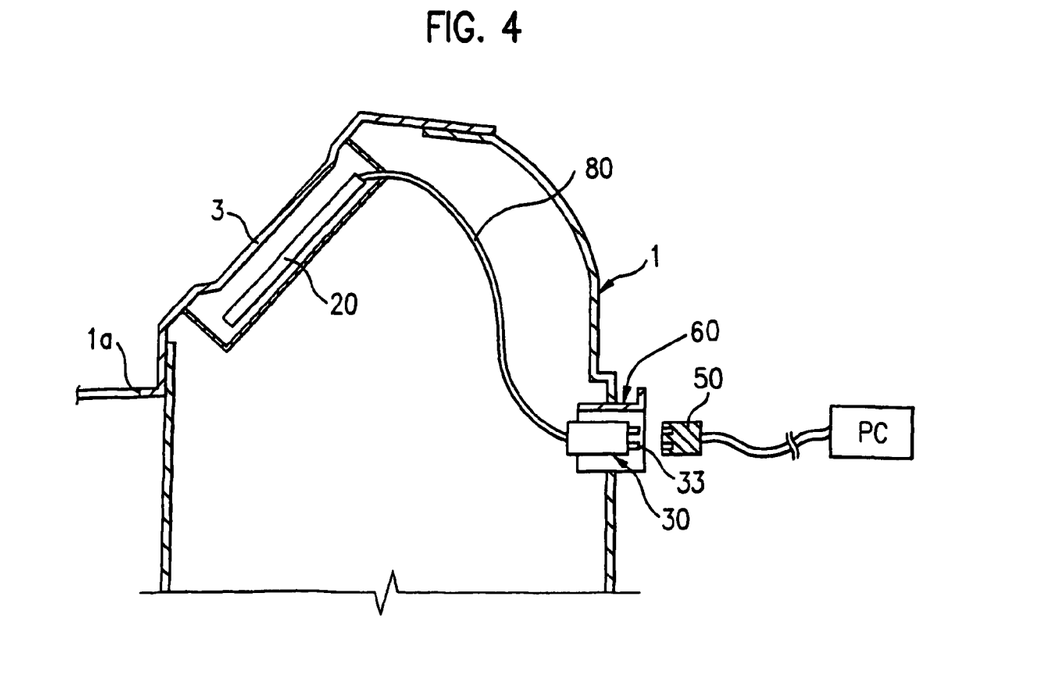
FIG. 4 illustrates a section of a device for data exchange with an external device in accordance with a second preferred embodiment of the present invention.
Figure 5:
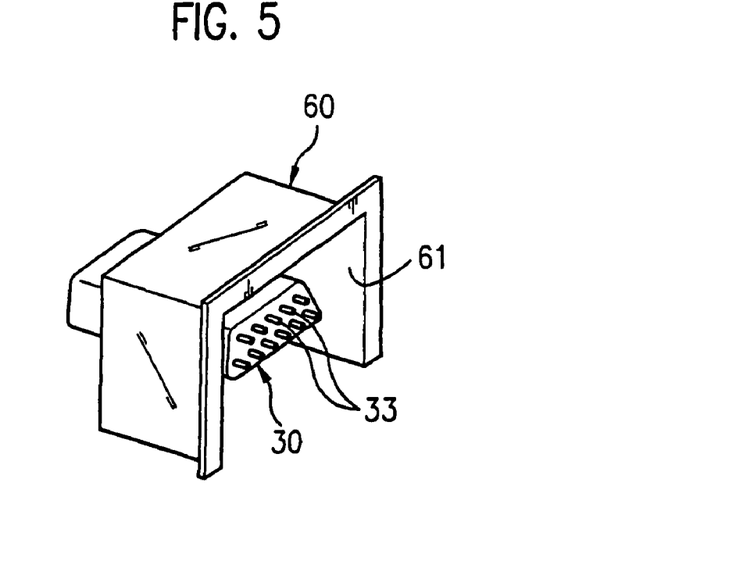
FIG. 5 illustrates a perspective view of key parts of FIG. 4.

A device for data exchange with an external device in accordance with a second preferred embodiment of the present invention will be explained, with reference to FIGS. 4 and 5. FIG. 4 illustrates a section of a device for data exchange with an external device in accordance with a second preferred embodiment of the present invention, and FIG. 5 illustrates a perspective view of key parts of FIG. 4.

Referring to FIG. 4, the device for data exchange with an external device in accordance with a second preferred embodiment of the present invention includes a circuit board 20 in a controller of a body 1, a connection port 30 fitted to a part of the body 1 for exchange of data on washing with the external device, and a lead line for connecting the connection port 30 and the circuit board 20. There is a waterproof member fitted to the part of the body 1 for fixing, and enclosing the connection port 30 to prevent inflow of water. It is preferable that the connection port 30 and the waterproof member are fitted to one side of rear or side surface of the body 1, wherein the waterproof member has a form to enclose the connection port 30 with a space thereto and an opening for connection of the connector thereto from outside of the washing machine.

The work of the device for data exchange with an external device in accordance with a second preferred embodiment of the present invention will be explained.

According to the second embodiment of the present invention, a connecting structure is provided, which connects the washing machine and the PC for down loading an infinite amount of external data through the connection pot 30 connected to the circuit board 20 or up loading a chick list checked in the washing machine to outside of the washing machine. It is preferable that the connection port 30 is fitted to a rear side or a side of the body 1, for better prevention of water infiltration than an upper surface, and better look than a case connection port 30 is fitted to the front.

The fitting positions of the connection port 30 will be explained further in detail for the cases the connection port 30 are fitted to the rear surface and side surface, respectively. When the connection port 30 is fitted to a rear surface, the washing machine looks neat and tidy as the connection port 30 is not in view of the user. When the connection port 30 is fitted to a side surface, permitting an easy access to the connection port 30 by a users hand, connection/disconnection of the cable 50 to the connection port 30 is made easy. As the fitting of the connection port 30 to the rear or side surface of the washing machine permits to avoid untidy look of the washing machine, the connection port 30 and the cable 50 may be connected permanently.

Moreover, as shown in FIGS. 4 and 5, since the connection port 30 is vulnerable to inflow of water even if the connection port 30 is fitted to the side or rear surface of the body 1, it is preferable that a waterproof member 60 is further included thereto. One embodiment of the waterproof member 60 has a form fitted to the body 1 to surround the connection port 30, with an open part 61 in one side thereof for connection to the cable 50. That is, if water splashed around the inlet (see FIG. 1) in the top of the body 1 of the washing machine is excessive when laundry is introduced into, or taken out of the washing machine, causing the water to flow down along the side or the rear surface, the waterproof member 60 cuts off inflow of the water into the connection port 30 as the waterproof member fitted to the body 1 to surround the connection port 30.

On the other hand, as shown in FIGS. 4 and 5, it is preferable that the connector part in the connection port 50 is of a male type with pins 33. Because, as the connection port 30 which is enclosed in the coating material is vulnerable to water inflow through the opening 61 due to water splash caused by careless handling of laundry of the user, the possibility of the water inflow into the pin holes is higher in the case of the female type than the pin type. However, it can be known that the double water protection structure of this embodiment may not require using the male type, necessarily. There may also be a cover (not shown) hinge coupled to a front of the waterproof member 60 for closing the opening 61. In the meantime, different from the pulsator type washing machine, the drum type washing machine has a horizontal washing tub, to require introduction of laundry through a front inlet, it is preferable that the connection port 30 is fitted to the rear surface or the side surface of the washing machine, because fitting the connection port 30 to a top surface may cause various problems.

Figure 6:
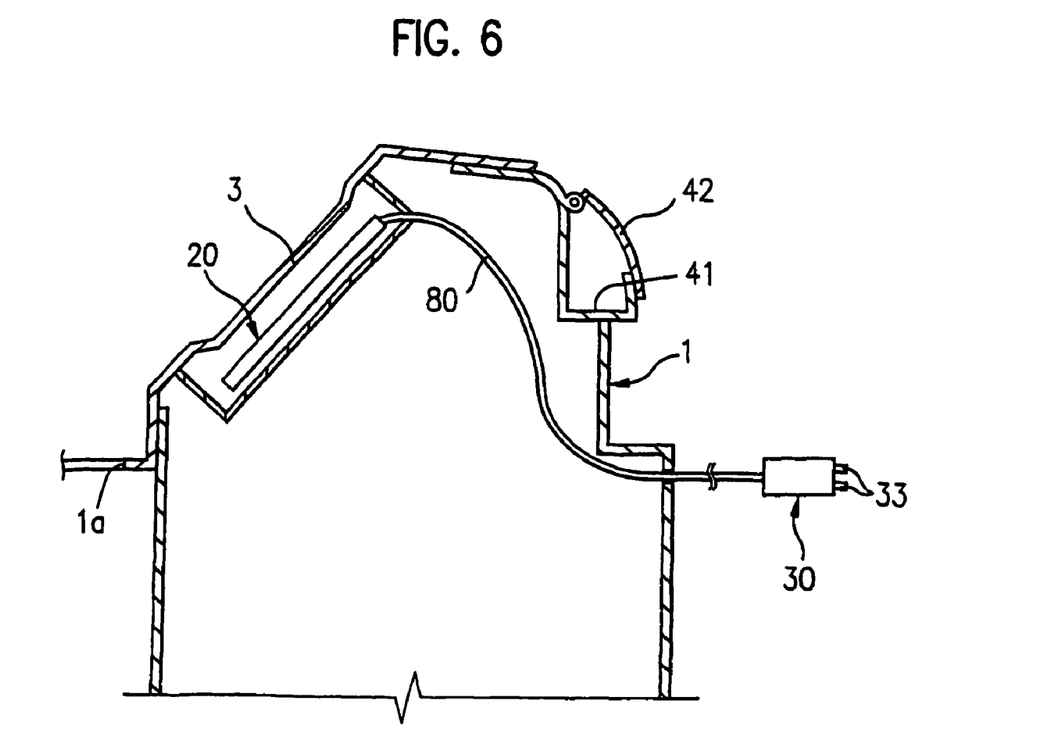
FIG. 6 illustrates a section of a device for data exchange with an external device in accordance with a third preferred embodiment of the present invention.

A device for data exchange with an external device in accordance with a third preferred embodiment of the present invention will be explained, with reference to FIGS. 6 and 7. FIG. 6 illustrates a section of a device for data exchange with an external device in accordance with a third preferred embodiment of the present invention, and FIG. 7 illustrates a perspective view showing the connection port hold means in FIG. 6.

Figure 7:
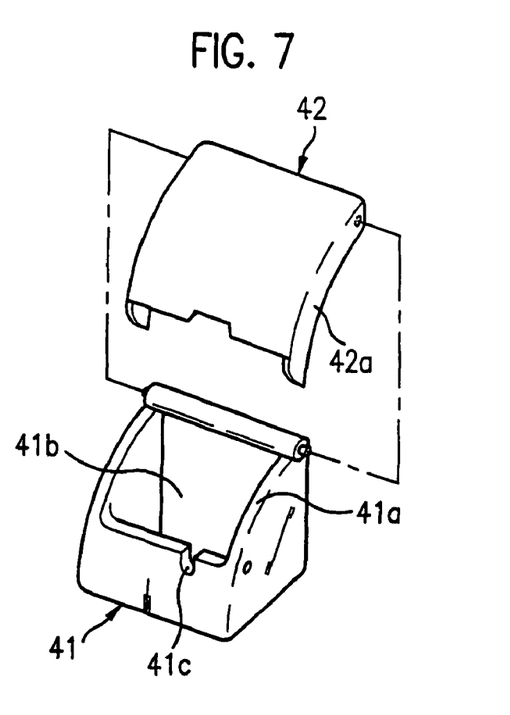
FIG. 7 illustrates a perspective view showing the connection port hold means in FIG. 6.

Referring to FIGS. 6 and 7, the device for data exchange with an external device in accordance with a third preferred embodiment of the present invention includes a circuit board 20 fitted to one side of a controller of a body 1, a lead line 80 connected to the circuit board 20 and exposed to outside of the body 1 for a length through a part of the body 1, a connection port 30 fitted to a fore end of the lead line 80 for exchange of washing data with an external device, and hold means fitted to the body 1 for holding the connection port 30 when the connection port 30 is not connected. The hold means includes a pocket 41 fitted to the body 1, and a cover 42 for cutting off of inflow of water thereto, and preventing falling off of the connection port 30 in the pocket 41 from the pocket 41. It is preferable that edges 42a of the cover have forms to wrap edges of the pocket 41 for cutting off inflow of water into a hold cavity 41b of the pocket 41 again. It is preferable that the cover 42 and the pocket 41 are hinge coupled. There is a slot 41c at a lower part of an inlet to the pocket 41 for leading the lead line 80 connected to the connection port 30 therethrough when the connection port 30 is held inside of the pocket 41. It is preferable that the pocket 41 is fitted to the rear or side surface of the body 1.

The work of the foregoing device for data exchange with an external device in accordance with a third preferred embodiment of the present invention will be explained.

It is preferable that the third embodiment connection port 30 is designed to pass through the rear or side surface of the body 1. The connection port 30 is passed through the rear or side surface of the body 1, and exposed for a preset length, for not being affected by the water splash when the connection port 30 is connected to the cable 30. That is, if water splashed around the inlet (see 1a in FIG. 1) in the top of the body 1 of the washing machine is excessive when laundry is introduced into, or taken out of the washing machine, causing the water to flow down along the side or the rear surface, the connection port 30 can be protected from inflow of water as the lead line 80 of the connection port 30 is exposed for a preset length to outside of the washing machine. It is also preferable that a sealing member (not shown) is provided to a pass through part between the connection port 30 and the body 1, for preventing inflow of small amount of water which may flow on the side or rear surface through a gap formed as the connection port 30 passes through the body 1.

In the meantime, as shown in FIG. 7, it is preferable that the pocket 41 is fitted to the body 1, either additionally, or as one unit, for tidy storage of the connection port 30 when the connection port 30 is not in use. Along with this, it is preferable that the cover 42 for covering the pocket 41 is fitted for preventing inflow of water into the connection port 30 stored in the pocket 41 and preventing the connection port 30 from being fallen off the pocket 41. It is more preferable that the edges 42a of the cover 42 of the pocket 41 have forms to wrap edges 41a of the inlet of the pocket 41 for cutting off inflow of water into the pocket 41. It is preferable that the pocket 41 and the cover 42 are hinge coupled for open/closing the cover with reference to one side of the pocket 41. That is, as the cover 42 is hinge coupled with the pocket 41, falling off of the cover 42 can be prevented, in advance. It is preferable that the slot 41c is formed at a lower part of the inlet of the pocket 41 for pass of the lead line 80 of the connection port 30 therethrough. In the meantime, it is preferable that the pocket 41 is fitted to the rear or side surface of the body 1, because, as explained, the pocket 41 fitted to the upper part of the body 1 is vulnerable to inflow of water, and looks not tidy, that is the same for the front surface of the washing machine. Though not shown, the hold means may have a variety of forms; as familiar examples, an auto-winding device which rewinds once pulled may be fitted for accommodating a required length of the exposed connection port 30, or a structure may be fitted for hooking the connection port 30 by using a ring formed on the connection port 30 and a hook formed on a part of the body 1.

A device for data exchange with an external device in accordance with a fourth preferred embodiment of the present invention will be explained with reference to FIGS. 8 and 9.

Figure 8:
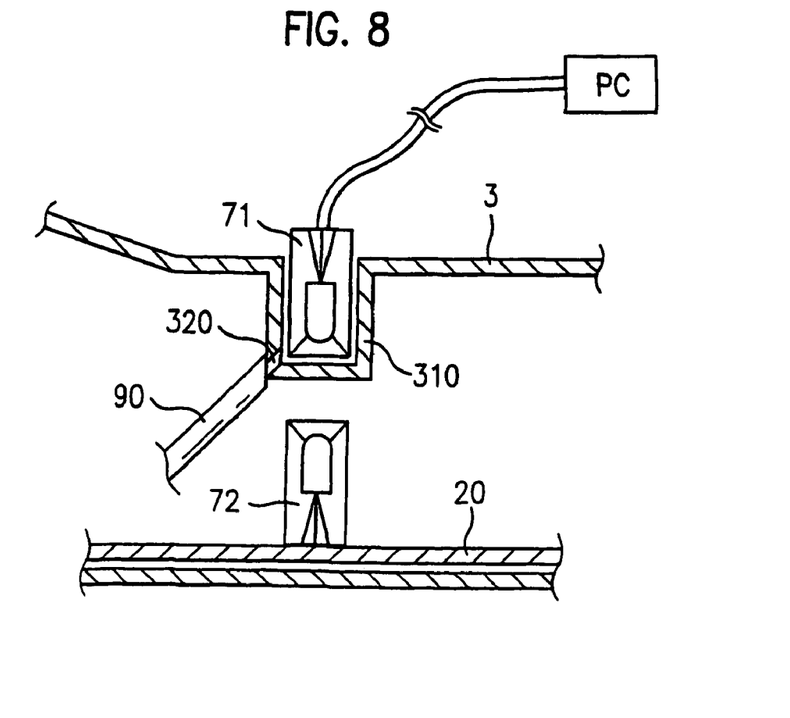
FIG. 8 illustrates a section of a device for data exchange with an external device in accordance with a fourth preferred embodiment of the present invention.

FIG. 8 illustrates a section of a device for data exchange with an external device in accordance with a fourth preferred embodiment of the present invention, including a first radio transceiver 71 fitted to a position outside of a control panel 3, a circuit board 20 fitted to a position inside of the control panel 3, and a second radio transceiver 72 fitted to a position on the circuit board 20 for receiving/transmitting a radio signal to the first radio transceiver 71. The first radio transceiver 71 is fitted in a substantially "U" formed recess 310 in the control panel 3, with a bottom of the recess 310 formed of a transparent material. The first radio transceiver 71 is connected to a PC or a terminal, such as a telephone set. There is a drain hole at one side of the recess 310 for draining water flowed into the recess, with a draining passage 90 fitted to the drain hole. The first radio transceiver 71 and the control panel 3 may be coupled by coupling male hooks 710 projected from both sides of a bottom of the first radio transceiver 71, and female hooks 25 projected from sides of a transparent window formed on the control panel 3. UV ports are employed as the first radio transceiver 71 and the second radio transceiver 72.

The work of the foregoing device for data exchange with an external device in accordance with a fourth preferred embodiment of the present invention will be explained.

The device for data exchange with an external device in accordance with a fourth preferred embodiment of the present invention can down load external infinite amount of data, or up load a check list checked at the washing machine by means of the first radio transceiver 71 fitted to a position on the circuit board 20 and the second radio transceiver 72 detachably fitted to a position on a surface of the control panel 3. That is, the fourth embodiment device of the present invention has a wireless connecting structure, in which the washing machine and the PC are connected without a wire. Even though the fourth embodiment device is employed to the washing machine that uses water, no additional waterproof structure is required. Because radio communication by using UV ray is made available as the first radio transceiver 71 which can make UV ray communication is fitted to the circuit board 20 opposite to the transmission part of the control panel 3, and the second radio transceiver 72 which can make UV ray communication is detachably fitted to a position on a surface of the control panel 3. That is, as the fourth embodiment device for data exchange with an external device of the present invention has a holeless structure that allows no water infiltration into the control panel 3 at all from the water of the washing machine in association with the radio connection structure, no additional waterproof structure is required.

In the meantime, the first radio transceiver 71 is fitted to the recess 21 in a part of the control panel 3, because the first radio transceiver 71 and the second radio transceiver 72 are required to be aligned exactly for an accurate transmission/reception of the UV ray. The recess 21 facilitates an exact positioning of the first radio transceiver 71 that permits an accurate transmission/reception in an UV ray communication with the second radio transceiver 72. Moreover, since the first radio transceiver 71 can be taken away from the panel 3 if the first radio transceiver 71 is not in use, an outer appearance of the washing machine can be simplified.

In the meantime, as shown in FIG. 8, it is more preferable that the drain hole is formed at a bottom of the recess 21 for preventing water collection in the recess 21, and the drain passage 50 is connected to the drain hole for draining the water collected in the drain hole to outside of the washing machine. Because, though the water accumulated on the bottom of the recess 310 does not particularly affect putting in, and taking out the first radio transceiver 71, there is fur formed on a surface of the recess the UV ray transmits therethrough due to the accumulated water. That is, since a transmittivity of the UV ray is dropped as the UV ray is cut off by the fur formed on the surface of the recess 21 in a process a communication proceeds by means of the UV ray, an accurate radio transmission may be impeded. Thus, the foregoing draining structure can prevent accumulation of water that in turn prevents formation of the fur in advance.

Figure 9:
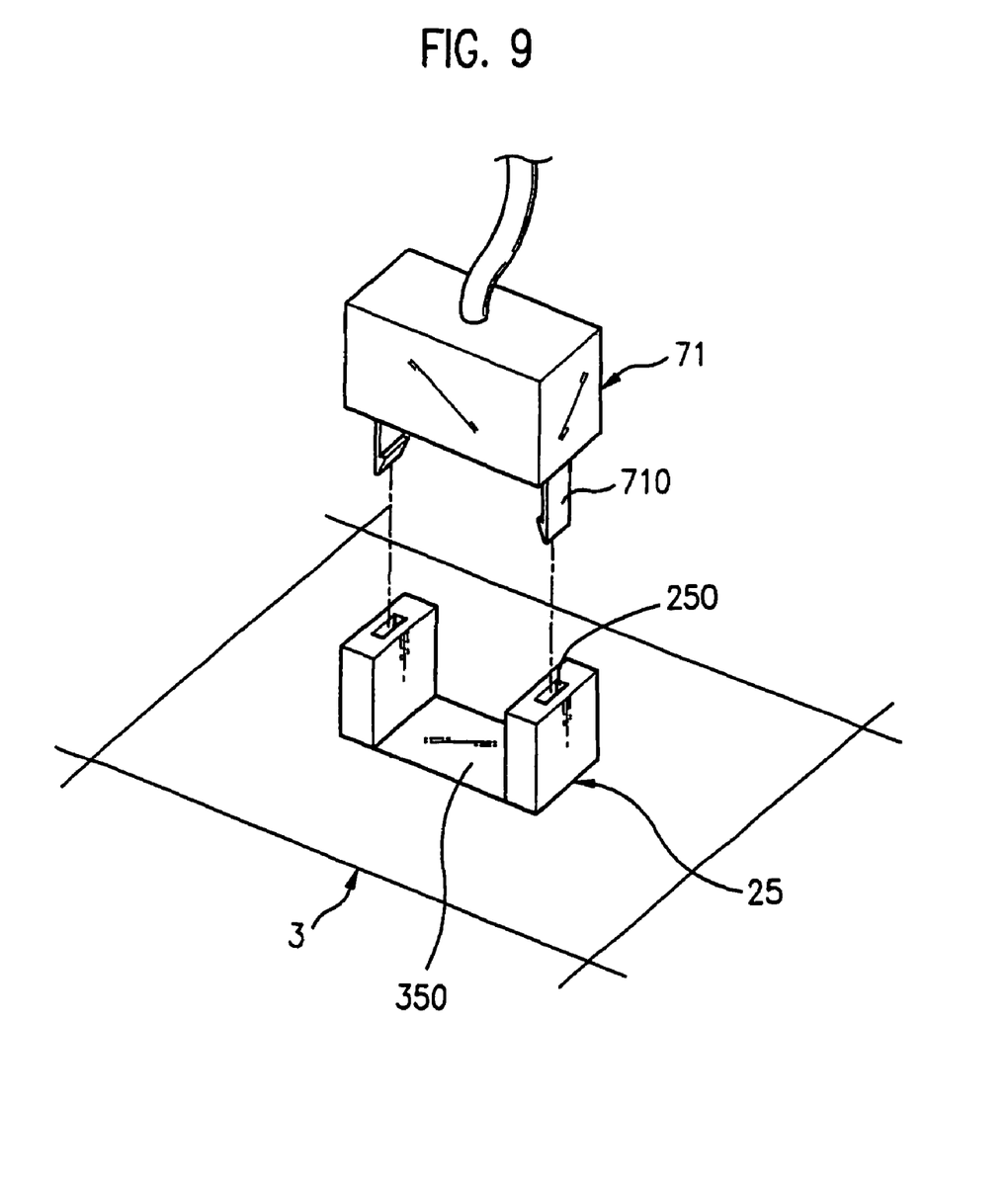
FIG. 9 illustrates a section showing other example of detachable structure of the control panel and the first radio transceiver in FIG. 8, schematically; and, FIG. 10 illustrates a perspective view of a device for data exchange with an external device in accordance with a fifth preferred embodiment of the present invention.

FIG. 9 illustrates a section showing other example of detachable structure of the control panel 3 and the first radio transceiver 71 in FIG. 8 schematically, including female hooks 25 each projected from one side of a transmission part 350 of the control panel 3 having a hook slot 250, and male hooks 710 each projected from one side of the first radio transceiver 71 for hooking into the female hook 25. In this instance, since the male hooks 710 on the first radio transceiver 71 can be detachably fastened to the female hook 25, the first radio transceiver 71 can make an accurate transmission/reception to/from the second radio transceiver 72 when the first radio transceiver 71 makes communication with the second radio transceiver 72. The transmission part 350 of the control panel 3 is formed of transparent material inclusive of a semi-transparent material for transmission of radio wave signal, because the transparent material can transmit the UV ray. The transmission part 350 may be formed of any material if the material can transmit the UV ray, even if the material is not transparent.

Figure 10:
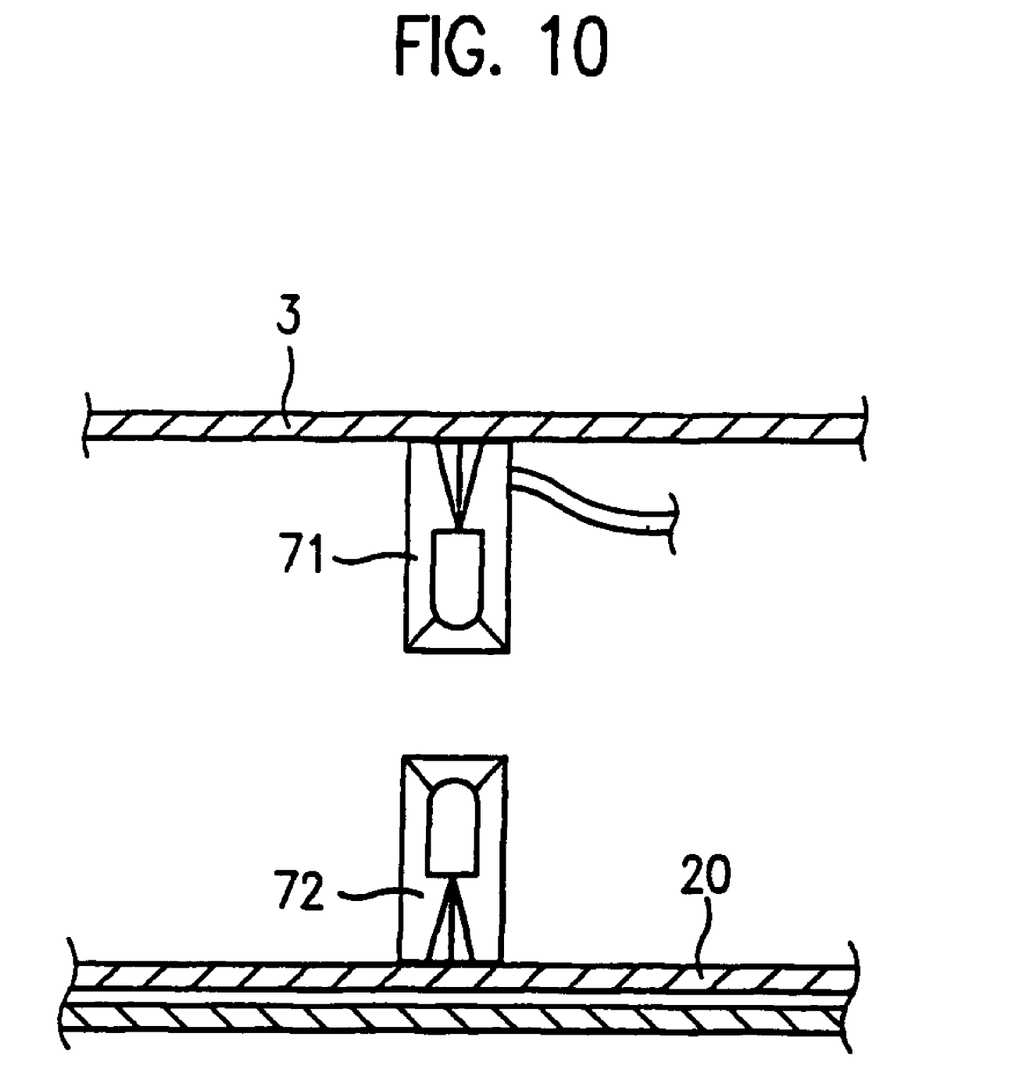

FIG. 10 illustrates a perspective view of a device for data exchange with an external device in accordance with a fifth preferred embodiment of the present invention, including a first radio transceiver 71 fitted to a position inside of the control panel 3, a circuit board 20 fitted to a position inside of the control panel 3, and a second radio transceiver 72 fitted to a position on the circuit board 20 for transmission/reception of a radio signal to/from the first radio transceiver 71. The first radio transceiver 71 is connected to an external terminal, such as a PC or a telephone set, and UV ports are employed as the first radio transceiver 71 and the second radio transceiver 72. Thus, the device for data exchange with an external device in accordance with a fifth preferred embodiment of the present invention can prevent water infiltration more positively because the first radio transceiver 71 is fitted inside of the control panel 3, and can make data exchange more smooth and accurately because there is no obstacle between the first radio transceiver 71 and the second radio transceiver 72.

In the meantime, even though the fourth embodiment device of the present invention is explained based on a case the device is applied to the pulsator type washing machine, it is evident that the fourth embodiment device of the present invention is applicable, not only to the pulsator type or the drum type washing machine, but also apparatuses that use water while connection to an external device is required.

It will be apparent to those skilled in the art that various modifications and variations can be made in the washing machine with a device for exchange of data with an external device of the present invention without departing from the spirit or scope of the invention. Thus, it is intended that the present invention cover the modifications and variations of this invention provided they come within the scope of the appended claims and their equivalents.

INDUSTRIAL APPLICABILITY

The first to fifth embodiments of the present invention can down load an external data, or up load a checked data at the washing machine to an external device through the device for data exchange with an external device, which are protected against to inflow of water. Accordingly, since a function for detection and transmission of information on use of the washing machine, such as an amount and kinds of laundry, and a function for reception of a program containing washing functions required for the washing machine from outside of the washing machine are made available, development of order made type washing machine that can provide washing functions fit to customers can be enhanced one step further. Along with this, since inflow of water into the connection port is cut off, out of order or malfunction of the washing machine caused by shorts can be prevented in advance, that prolong a lifetime of the washing machine.

What is claimed is:

1. A washing machine comprising:
a controller fitted to a body of the washing machine for washing control; and
a device provided at one side of the body for exchange of washing related data between the controller and an external device, wherein the device includes:
   a circuit board connected for transmission/reception of an electrical signal to/from the controller;
   a connection port fitted to the circuit board for exchange of washing related data with external device;
   a coating material coated on an upper surface and bottom surface of the circuit board for cutting off water infiltration into circuit lines on the circuit board, and a waterproof shell surrounding an outside of the connection port for cutting off inflow of the water into inside of the connection port.

2. A washing machine as claimed in claim 1, wherein the connection port is hook coupled to the circuit board for transmission of a load exerted to the connection port to the circuit board when the cable is connected/disconnected to the connection port.

3. A washing machine as claimed in claim 1, wherein there is an opening on the control panel over the connection port for access to the connection port, and a rubber plug in the opening for plugging the opening when the cable is not connected to prevent inflow of the water.

* * * * *